May 6, 1969     D. R. WRIGHT     3,442,992
PREPARATION OF CYLINDRICAL PLASTIC STRUCTURES
Filed Nov. 5, 1965
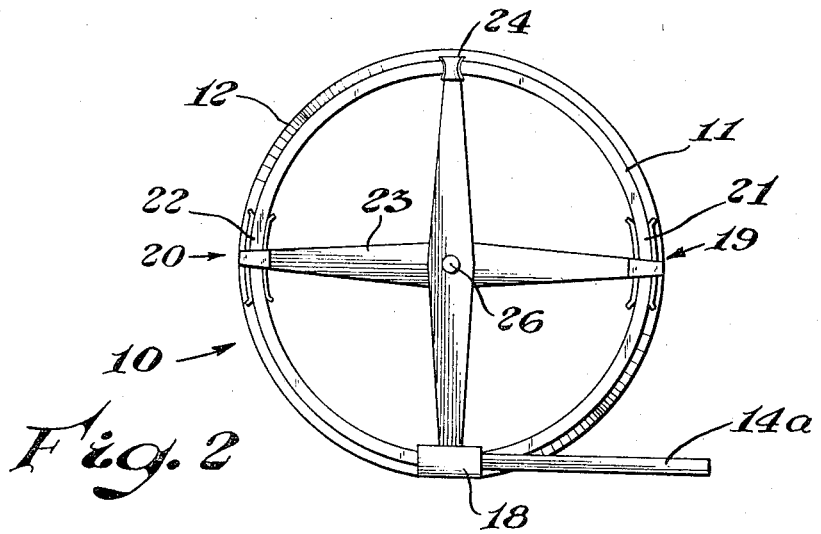
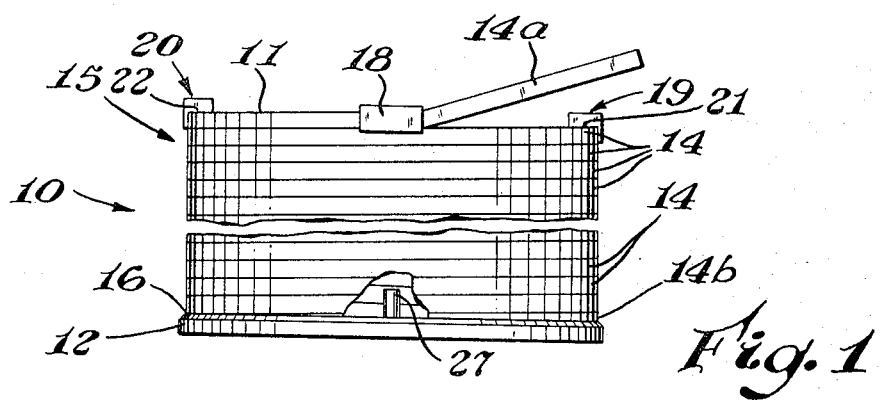
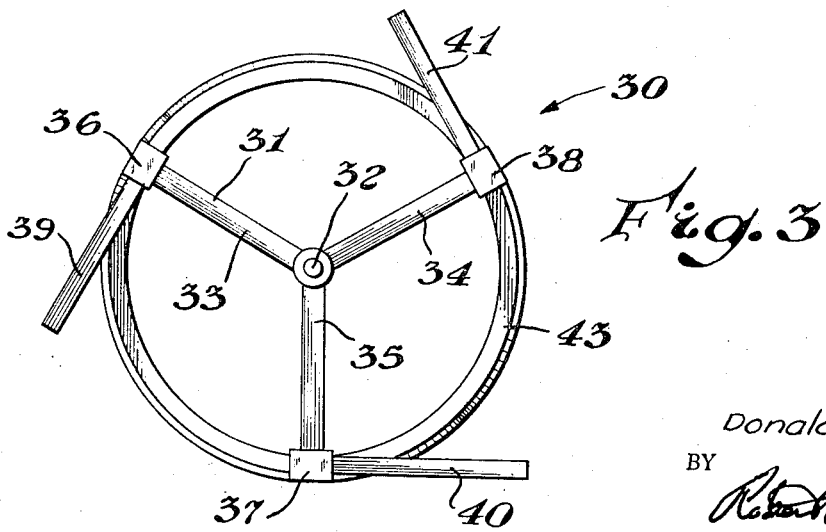
INVENTOR.
Donald R. Wright
BY
AGENT United States Patent Office 3,442,992
Patented May 6, 1969

3,442,992
PREPARATION OF CYLINDRICAL PLASTIC STRUCTURES
Donald R. Wright, Midland, Mich., assignor to The Dow Chemical Company, Midland, Mich., a corporation of Delaware
Filed Nov. 5, 1965, Ser. No. 506,557
Int. Cl. B29d 27/02; B29h 7/20
U.S. Cl. 264—45    7 Claims

ABSTRACT OF THE DISCLOSURE

A method and apparatus for forming a spirally generated foam plastic structure is disclosed. The apparatus is guided by the cylindrical walls and does not require a center pivot, support or mast.

---

This invention relates to an improved method for the generation of cylindrical plastic structures, and more particularly relates to a method for the preparation of cylindrical plastic structures wherein successive strips of plastic material are disposed to form a resultant structure.

It is known from Belgian Patent 612,405 (equivalent to my U.S. Patents 3,206,899 and 3,337,384) that structures may be readily prepared from synthetic resinous foamed plastic material by the successive disposition of layers of synthetic resinous thermoplastic foam material by means of a material disposing head secured to a pivotably mounted arm. Cylindrical structures may also be generated in accordance with Belgian Patent 612,405 wherein an arm or boom is pivotly mounted to a column and rotated about the column as the foamed plastic material is disposed and joined to an adjacent layer of plastic material.

Oftentimes, it is desirable to prepare cylindrical plastic structures of considerable height and the requirement of a central column becomes extremely inconvenient, particularly when relatively long or tall cylindrical structures are prepared. Difficulty is encountered in removing the column therefrom in that a crane or other lifting device must be employed which can remove the column without damaging the structure. Such a crane must be capable of lifting an object a distance significantly greater than the height of the cylindrical structure. Alternatively, the central column can be removed in a piecemeal manner if it is appropriately designed. This requires considerable labor and inconvenience as well as expense. Generally, cylindrical foam structures suitable for use as a silo or storage container are oftentimes inconveniently situated and are not adjacent suitable equipment and machinery for the removal of such a column, or, indeed, the initial erection of such a column. Such columns, if of significant length, must be guided or supported at the top and rise to a height usually substantially greater than the desired cylindrical structure.

It would be desirable if there were available an apparatus which would permit the construction of cylindrical foamed structures of relatively great height without the necessity of providing a central column for the guidance of the foamed plastic depositing head.

It would also be beneficial if there were available an apparatus for the preparation of foamed plastic structures of a generally cylindrical configuration which required no external guidance from central columns.

It would also be beneficial if there were available an apparatus for the preparation of foamed plastic cylindrical structures which employed an operating means of minimal weight and one that was readily transportable.

Further, it would be beneficial if there were available an improved method for the preparation of cylindrical foamed plastic structures having a relatively great height.

These benefits and other advantages in accordance with the present invention are achieved with an apparatus that comprises a support means having at least one foam plastic material depositing head so constructed and arranged so as to deposit a layer of predetermined thickness of a foamed plastic material on top of a foamed plastic strip. A plurality of guide means lying in a circle and secured to the support means the guide means adapted to contact a cylindrical foamed plastic structure and maintain the support means in generally fixed radial relationship to the axis of generation of the cylindrical structure being formed.

Also contemplated within the scope of the invention is a method of preparing a foamed cylindrical structure comprising pivoting a strip-depositing apparatus on a fixed pivot centrally disposed relative to the desired cylindrical structure the pivot being generally coaxial with the axis of the desired structure, continously depositing layers of synthetic resinous material in a generally helical fashion, supporting the strip-depositing means on the structure so produced and guiding the foam-depositing means after initial helically disposed layers are deposited entirely by the deposited layers of the plastic cylindrical structure.

Further features and advantages of the present invention will become apparent for the following specification taken in connection with the drawing wherein:

FIGURE 1 is a side view of a cylindrical structure being prepared in accordance with the invention.

FIGURE 2 is a schematic representation of a top view of a structure of FIGURE 1 schematically depicting the apparatus of the invention.

FIGURE 3 is a schematic top view of an alternate embodiment apparatus of the invention.

In FIGURES 1 and 2, there is schematically illustrated a helical structure generally designated by the reference numeral 10, and an apparatus in accordance with the invention generally designated by the reference numeral 11. The cylindrical structure 10 comprises a base or foundation 12 which supports a symmetrically disposed cylinder 11 of synthetic resinous foam. The cylinder of resinous foam comprises a plurality of turns 14 secured to adjacent turns 14 which form the cylindrical structure. A layer or strip 14A is disposed at an upper end of the structure generally designated by the reference numeral 15. Whereas, a starter strip 14B is disposed at the bottom 16 of the structure 10. The strip depositing apparatus 18 is supported by the upper end 15 of the cylindrical structure 10. A strip-depositing head 18 is in operative engagement with the strip 14A and secures it to adjacent strip 14. Arcuate guiding means 19 and 20 are disposed adjacent upper strip 14.

The apparatus 11, as depicted in FIGURE 2, comprises a frame or support means 23 which is in operative engagement with the strip-depositing head 18, the arcuate guide means 19 and 20 and a third guide means 24. The guide means 19, 20 and 24 and the strip-depositing head 18 lie in a circle disposed about the axis of the cylindrical structure being generated. The arcuate guide means define a foam receiving slot or channel 21 and 22 respectively, adapted to receive a portion of the deposited structure and conform in curvature. A pivot 26 is disposed within the support means 23 and lies on the axis of the structure being generated or at the center of a circle which passes through the centers of the guide means 19, 20 and 24 and strip-depositing head 18. The base 12 supports a pivot engaging means 27 adapted to engage the pivot 26 of the support 23, while the first few turns or layers of the cylindrical structure are prepared.

In operation of the apparatus as described in FIGURES 1 and 2, the initial strip is laid substantially in accordance with the disclosure of the Belgian Patent 612,405. Initially, the pivot 26 of the apparatus 11 is placed in operative engagement with the pivot engaging means 27 supported by the base 12. A suitable foamed strip or foam-forming material is fed to the strip-depositing head 18 and the apparatus is driven about the pivot 26 and the axis of the cylindrical structure being prepared by a suitable means such as the foam-engaging rolls disclosed in Belgian Patent 612,405, which beneficially, may be separated from the strip-depositing head or additional rolls to drive the apparatus 11, may be disposed on the guide means 19, 20 or 24 to provide rotation of the apparatus 11 at a rate commensurate with the rate of deposition of the strip 14A. Beneficially, the initial layers 14 which are deposited by the apparatus, are maintained in a circular or cylindrical configuration by engagement of the pivot apparatus 11 with the pivot engaging means 27. A cylindrical pattern being established, the apparatus rises and disengages itself from the pivot engaging means 27 and is guided by the structure itself by means of the guide means 19, 20 and 24. Beneficially, the guide means are readily prepared by forming a trough of sufficient size to receive and be guided by the upper cylindrical edge of the disposed structure, or alternatively, if desired, may comprise rolls fixed to the support means 23 which may be driven by an external means such as a motor or by idling rolls, depending on the size of the structure and the mass of the support means.

In FIGURE 3, there is schematically represented an alternate embodiment of the invention generally designated by the reference numeral 30. The apparatus 30 comprises a support means or spider 31 having a centrally disposed pivot point 32, a plurality of arms 33, 34 and 35, which support a plurality of strip-depositing heads 36, 37 and 38, respectively. The strip-depositing heads 36, 37 and 38 lie on a circle which has its center at the pivot 32. A plurality of foam strips 39, 40 and 41 are illustrated entering the strip-depositing heads 36, 37 and 38, respectively. The apparatus 30 is supported by a generally cylindrical foamed structure 43 formed from the strips 39, 40 and 41. The operation of the embodiment of FIGURE 3 is generally similar to the embodiment illustrated in FIGURES 1 and 2 with the exception that three strip-depositing heads are utilized. Each of the strip-depositing heads also acts as a guide means and engages the formed structure below the strip being deposited in the manner of the strip-depositing heads disclosed in Belgian Patent 612,405. Thus, the resultant cylindrical structure has a triple wound helical configuration and the seams form a triple-thread pattern utilizing the apparatus in accordance with the invention. Beneficially at least one of the heads has an arcuate guide means to prevent deviation from a true cylinder.

Beneficially using a support such as the support 23, wherein the guide heads or material depositing heads are slideably positioned on the arms, cylindrical plastic structures of almost any desired diameter are readily prepared.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. An apparatus for the preparation of foam plastic structures of a cylindrical configuration, the apparatus comprising in cooperative combination a support means, the support means having affixed thereto at least one foam plastic material depositing head which deposits a layer [of pre-determined thickness] of a foamed plastic material on top of a previously deposited foamed plastic strip, a plurality of guide means lying in a circle and secured to the support means, the guide means adapted to contact a cylindrical foamed plastic structure and maintain the support means in a generally fixed radial relationship to the axis of generation of the cylindrical structure being formed and means to temporarily secure the support means to a pivot lying at the center of a circle which passes through the guide means and said depositing head.

2. The apparatus of claim 1 including means to propel the support means about the axis of generation of the structure being formed.

3. The apparatus of claim 1, wherein a plurality of foam plastic material depositing heads are affixed to the support and lie on a circle.

4. The apparatus of claim 3, wherein the foam depositing heads have means to guide the support secured thereto.

5. The apparatus of claim 1, wherein at least one of the guide means defines an arcuate trough adapted to engage an upper edge of a structure being prepared.

6. A method of preparing a foamed cylindrical structure comprising rotating a foam depositing apparatus on a fixed pivot centrally disposed relative to the desired cylindrical structure, the pivot being generally coaxially disposed with relationship to the axis of the desired structure, continuously depositing layers of synthetic resinous material in a generally helical fashion, supporting the foam depositing means on the structure so produced and after initially helically disposed layers are deposited guiding the foam depositing means entirely by the deposited layer of the cylindrical structure.

7. The method of claim 6, wherein a plurality of foam plastic layers are simultaneously deposited.

References Cited
UNITED STATES PATENTS 2,671,939   3/1954   Everhardt et al. _____ 264—45
3,207,827   9/1965   Kuehnle.

JULIUS FROME, *Primary Examiner.*

LEON GARRETT, *Assistant Examiner.*

U.S. Cl. X.R.

18—12; 25—30; 264—47